United States Patent Office 3,513,143
Patented May 19, 1970

---

3,513,143
PROCESS FOR THE MANUFACTURE OF BRANCHED POLYETHYLENE OF HIGH MOLECULAR WEIGHT
Bernd Diedrich and Karl Diether Keil, Frankfurt am Main, and Klaus Hofmann, Ingelheim am Rhine, Germany, assignors to Farbwerke Hoechst Aktiengesellschaft, Frankfurt am Main, Germany, a corporation of Germany
No Drawing. Filed Mar. 3, 1967, Ser. No. 620,226
Claims priority, application Germany, Mar. 4, 1966,
F 48,579
Int. Cl. C08f 15/04
U.S. Cl. 260—88.2                                   8 Claims

ABSTRACT OF THE DISCLOSURE

Manufacture of copolymers of ethylene with butene-(1) having a density below 0.942 g./cc., a butene-(1) content of 0.5 to 4.7% by weight and an ash content of less than 0.03%, in the presence of a catalyst consisting of 0.1 to 0.01 millimole, per liter of dispersing agent, of a trivalent titanium compound containing chlorine and alkoxy groups and 0.5 to 4 millimoles of aluminum triisobutyl per liter of dispersing agent.

---

The present invention relates to a process for the manufacture of branched polyethylene of high molecular weight.

According to U.S. Pat. application Ser. No. 485,543 filed on Sept. 7, 1965, now abandoned, the polymerization of ethylene and the copolymerization of ethylene with $\alpha$-olefins with up to 8 carbon atoms in the presence of Ziegler mixed catalysts containing chlorine, titanium and aluminum at temperatures within the range of 20° to 150° C. and pressures of up to 50 atmospheres gage is carried out using a concentration of chlorine and titanium-containing catalyst component of less than 0.05 millimol, advantageously 0.01 to 0.001 millimol, per liter of dispersing agent and a molar ratio of aluminum containing component to titanium containing component of above 10:1, advantageously within the range of 20:1 to 1000:1, and the dispersing agent used for the polymerization and the monomeric olefin contain less than 20 p.p.m. of impurities capable of reacting with the catalyst components. A further feature of the said process is that the titanium containing catalyst component or its reaction products remain completely in the polyolefin and the aluminum containing catalyst component or its reaction products remain completely or partially in the polyolefin.

Belgian Pat. 538,782 describes a process for the manufacture of copolymers by polymerization of a mixture of ethylene and $\alpha$-olefins in the presence of catalysts consisting of organo-aluminum compounds and reducible compounds of metals of subgroups IV to VI of the Mendeleeff Periodic Table. Copolymers of ethylene with $\alpha$-olefins always have a lower density and lower crystallinity than the linear homopolymer whereby some mechanical properties, for example, flexibility, toughness and resistance to environment stress cracking, are improved.

The influence which the number and length of the branchings in the copolymer have on the physical properties has already been described in the last years in several publications.

The correlation of crystallinity and density to short-chain branchings of ethylene-propylene copolymers and ethylene-butene copolymers obtained by the Phillips process have been described in Industrial and Engineering Chemistry, 48, page 1161 (1956).

The ethyl branchings in the copolymer influence the crystallinity and density about 1.5 times more than methyl branchings. To obtain a copolymer of a density of 0.922 g./cc. there are needed 14 ethyl side chains for each 1000 carbon atoms (5.6% by weight butene) or 21 methyl branchings for each 1000 carbon atoms (6.25% by weight propylene).

It has been described by R. W. Ford in Journal of Applied Polymer Science, vol. 9, p. 2879 to 2886, FIG. 1, that six branchings must be introduced for each 1000 carbon atoms into Ziegler copolymers to obtain a density of 0.940 g./cc.

As emphasized in Journal of Polymer Science 21 1956), pp. 157 to 159, particularly p. 159, FIG. 2, copolymers of ethylene and butene-(1) have a lower crystallinity than copolymers of ethylene with pentene and hexene having the same number of branchings.

In Zeitschrift für Angewandte Chemie 73, p. 190 (1961), it is stated that by the incorporation of a small percentage of butene-(1) the density is somewhat more reduced than by the same incorporation of propylene. The copolymers described in this publication were obtained with the help of Ziegler catalysts.

In contrast thereto is an investigation by V. L. Folt, in SPE Transaction October 1962, p. 285, carried out on copolymers of ethylene with four different $\alpha$-olefins, from which Folt deduced that it is only the number and not the length of the branchings that influences the density. Folt, however, gives no information about the manufacturing process.

The publication by R. W. Ford mentioned above describes the physical properties of 43 copolymers of ethylene with 1-olefins obtained by the Ziegler process. The test results indicated by Ford show that the density of these polymers depends only on the number and not on the length of the chain branchings introduced by the co-monomer. In a similar manner it is shown that the mechanical properties depend primarily only on the density and are independent of the length of the chain branching.

It is evident from the above examples taken from the literature that in the case of copolymers of ethylene with $\alpha$-olefins no generally established laws exist for the correlation of the density to the number or length of the short chain branchings.

The physical properties such as, for example, density, crystallinity and melting point, which depend on the molecule structure, e.g. number and length of chain branchings, regularity of incorporation of co-monomer, are rather determined by the nature of the polymerization catalyst used and by the co-monomer used for the polymerization.

The present invention provides a process for the manufacture of high molecular weight copolymers of ethylene with butene-(1) having a density below 0.942 g./cc. and a butene content within the range of 0.5 to 4.7% by weight, by copolymerization of ethylene with 0.5 to 5% by volume of butene-(1) in a hydrocarbon in the presence of a Ziegler mixed catalyst, which comprises using as chlorine and titanium-containing catalyst component a trivalent titanium compound containing chlorine and alkoxy groups and as aluminum containing catalyst component aluminum triisobutyl, and carrying out the polymerization with a concentration of trivalent titanium compound containing chlorine and alkoxy groups within the range of 0.1 to 0.01 millimole per liter of dispersing agent and a concentration of aluminum triisobutyl within the range of 0.4 to 4 millimols per liter of dispersing agent under a pressure within the range of 1 to 6 atmospheres gage.

When using the system in accordance with the invention of a special Ziegler mixed catalyst, i.e. a trivalent titanium compound containing chlorine and alkoxy groups with aluminum triisobutyl in the concentrations indicated above, at a pressure within the range of 1 to 6 atmospheres gage, only extremely small amounts of less than 0.8% by weight of soluble parts are formed in the dispersing agent during the polymerization and it is furthermore rendered possible to control the density of the copolymer by a particularly low content of butene which is distributed very uniformly over the polymer chain.

The trivalent titanium compounds containing chlorine and alkoxy groups to be used in accordance with the invention are obtained in known manner. They are advantageously obtained by reduction of dichloro-dialkoxy titanium compounds of the formula $TiCl_2(OR)_2$ in which R is a hydrocarbon radical with 1 to 5 carbon atoms, preferably an isopropyl and/or an isobutyl radical, with ethylaluminum sesquichloride at a temperature within the range of 0 to 50° C. in an inert dispersing agent, for example a saturated straight-chain or branched aliphatic or unsubstituted cycloaliphatic hydrocarbon, for example, hexane, heptane or cyclohexane having a boiling point within the range of 140° to 200° C., followed by a heat treatment at a temperature within the range of 60° to 140° C., advantageously 70° to 100° C., while isolating the solid reaction product with the exclusion of air and moisture, if desired.

The concentration of the titanium catalyst containing chlorine and alkoxy groups used in the process of the invention is within the range of 0.1 to 0.01 millimol per liter of dispersing agent while the concentration of the aluminum triisobutyl used in accordance with the invention is within the range of 0.5 to 4 millimols per liter of dispersing agent.

1 g. of titanium in the mixed catalyst of the invention can produce 300 kg. of copolymer so that, without removal of the catalyst, the ash content of the copolymer is below 0.03%.

When copolymers of ethylene and α-olefins of a density of 0.942 to 0.918 g./cc. are made according to the known Ziegler process by copolymerizing ethylene with α-olefins in the presence of considerably higher concentrations of catalyst, for example 1 to 10 millimols per liter, relatively large amounts of soluble parts which may be within the range of 2 to 10% by weight, depending on the density of the polymer, and remain in the dispersing agent as useless by-products, are formed during the polymerization.

It was surprising and could not be foreseen that the catalyst system according to the invention and the polymerization at low pressures lead to a copolymer of ethylene of low density, i.e. 0.942–0.918 g./cc., which is of great technical interest especially because it contains only a very slight amount of soluble parts, i.e. 0.2 to 0.8% by weight calculated on undissolved polymer.

The polymerization is carried out in inert solvents, for example petroleum fractions poor in olefin boiling at a temperature within the range of 140° to 200° C., which must be thoroughly freed from oxygen, or in saturated aliphatic or cycloaliphatic hydrocarbons, for example, hexane, heptane or cyclohexane, at temperatures within the range of 30° to 100° C., advantageously 50° to 85° C.

The copolymerization in accordance with the invention is carried out at pressures ranging from 1 to 6 atmospheres gage. It has been found that by using the above pressure range and simultaneously the other process steps of the invention, the butene-(1) is incorporated in a particularly uniform manner. The density of the copolymers obtained by the process of the invention is already reduced by a considerably lower content of comonomer than in the known copolymers.

Whereas into the known Ziegler copolymers (cf. R. W. Ford loc. cit.) 6 chain branchings must be introduced for each 1000 carbon atoms to obtain a density of 0.940 g./cc., the process in accordance with the invention enables a density of 0.940 g./cc. to be obtained by the incorporation of only 2 ethyl branchings for each 1000 carbon atoms and even a density of 0.929 g./cc. by the incorporation of 6 chain branchings for each 1000 carbon atoms.

The process of the invention yields a branched polyethylene of high molecular weight which can be degraded thermomechanically in known manner to a desired molecular weight. The degraded polyethylene has a density within the range of 0.918 to 0.942 g./cc.

The copolymers obtained by the process of the invention can advantageously be used for making films and sheets which are distinguished by a good transparency and mechanical strength. They may, however, also be used with advantage for the manufacture of injection moulded or extruded articles.

The following examples serve to illustrate the invention but are not intended to limit it.

EXAMPLE 1

(a) Preparation of a titanium catalyst to be used in the process of the invention.—Into a 500 cc. four-necked flask, 200 cc. of a diesel fuel fraction free from olefin and having a boiling point within the range of 140° to 160° C. were placed together with 9.9 g. (40 millimols) of ethylaluminum sesquichloride with the exclusion of oxygen and moisture. Within 30 minutes, 9.4 g. (40 millimols) of dichlorotitanic acid diisopropyl ester in 40 cc. of cyclohexane were added dropwise at 25° C. while stirring. A fine brown precipitate separated. For an after-reaction, the batch was kept for a further 2 hours at 70° C. while stirring. The mother liquor was then decanted and the residue of titanium remaining behind was washed 4 times with 200 cc. of the above diesel fuel fraction.

(b) Polymerization.—Into a 150-liter vessel 100 liters of diesel fuel boiling within a range of 140° to 200° C. were introduced and the air was displaced by purging with pure nitrogen. A solution of 79.5 g. (400 millimols) of aluminum triisobutyl in 500 cc. of diesel oil boiling at a temperature within the range of 140° to 200° C. was then added and the whole was stirred for 5 minutes under nitrogen. 3 millimols of isolated catalyst of titanic acid ester obtained as described sub (a) were added and ethylene was introduced together with 3.5% by volume of butene-(1). The polymerization was carried out at 80° C. under a pressure of 5 atmospheres gage. After 4 hours the copolymer so obtained was separated from the dispersing agent by filtration and dried. There were obtained 21 kg. of a solid copolymer having a viscosity $\eta$ spec/c. of 37, determined on a 0.1% solution in decahydronaphthalene, and an ash content below 0.03% by weight.

The soluble parts still contained in the dispersing agent amounted to less than 0.2% by weight calculated on the solid polymer. The infrared spectrum of the copolymer showed 2 chain branchings for each 1000 carbon atoms (0.8% by weight of butene). The density of the products which had been degraded to a value $\eta$red. of 2.2 was 0.941 g./cc.

EXAMPLE 2

In a 150-liter vessel 100 liters of diesel fuel having a boiling point within the range of 140° to 200° C. were purged with nitrogen. After the addition of 79.5 g. (400 millimols) of aluminum triisobutyl and 4 millimols of isolated catalyst of titanic acid ester, obtained as described in Example 1a, ethylene and 3.5% by volume of butene-(1) were introduced and the whole was heated to 80° C. while stirring. At that temperature, the polymerization was carried out for 4 hours under a pressure of at most 3.5 atmospheres gage. The reaction mixture was then cooled and filtered and the copolymer was dried. The yield was 15.6 kg. The viscosity $\eta$red. was 26.6 determined on a 0.1% solution in decahydronaphthalene. The ash content of the copolymer was below 0.03% by weight.

The amount of soluble parts still contained in the dispersing agent was below 0.2% by weight calculated on the solid polymer.

The infrared spectrum of the copolymer showed 6.5 branchings for each 1000 carbon atoms (2.6% by weight butene). The density of the product which had been degraded to a value $\eta$red. of 2.2 was 0.929 g./cc.

What is claimed is:

1. A process for the manufacture of copolymers having a high molecular weight, a density below 0.942 g./cc. and a butene-(1) content within the range of 0.5 to 4.7% by weight, comprising copolymerizing, at a pressure within the range of 1 to 6 atmospheres gage, ethylene with 0.5 to 5% by volume butene-(1) in a hydrocarbon in the presence of a dispersing agent and a Ziegler mixed catalyst, said mixed catalyst consisting essentially of a chlorine and titanium-containing catalyst component comprising a trivalent titanium compound containing chlorine and alkoxy groups having up to 5 carbon atoms and an aluminum containing catalyst component comprising aluminum triisobutyl, the concentration of trivalent titanium compound being within the range of 0.1 to 0.01 millimole per liter of dispersing agent, the concentration of aluminum triisobutyl being within the range of 0.5 to 4 millimoles per liter of dispersing agent and said trivalent titanium compound being obtained by reduction of a dichloro-dialkoxy titanium compound of the formula $TiCl_2(OR)_2$ wherein R is a hydrocarbon radical with 1 to 5 carbon atoms with ethylaluminum sesquichloride at a temperature within the range of 0 to 50° C. in an inert dispersing agent.

2. The process of claim 1 wherein R is isopropyl.
3. The process of claim 1 wherein R is isobutyl.
4. The process of claim 1 wherein the polymerization is carried out at a temperature within the range of 30° C. to 100° C.
5. The process of claim 1 wherein the polymerization is carried out at a temperature within the range of 50° C. to 85° C.
6. The process of claim 1 wherein the ageing of the catalyst is carried out at a temperature within the range of 60° C. to 140° C.
7. The process of claim 1 wherein the copolymers have a density within the range of 0.918 to 0.942 g./cc.
8. The process of claim 9 wherein the amount of soluble copolymers in the dispersing agent is within the range of 0.2 to 0.8% by weight.

References Cited

UNITED STATES PATENTS

| | | | |
|---|---|---|---|
| 2,953,552 | 9/1960 | Stampa | 260—88.2 |
| 3,004,015 | 10/1961 | Coover et al. | 260—88.2 |
| 3,058,963 | 10/1962 | Vandenburg | 260—88.2 |
| 3,173,901 | 3/1965 | Newberg et al. | 260—88.2 |
| 3,219,649 | 11/1965 | Nowlin et al. | 260—88.2 |

JAMES A. SEIDLECK, Primary Examiner

U.S. Cl. X.R.

252—429; 260—94.9